United States Patent
Harduf et al.

(10) Patent No.: US 12,061,624 B2
(45) Date of Patent: Aug. 13, 2024

(54) TECHNIQUES FOR REPLICATING MANAGEMENT DATA

(71) Applicant: EMC IP Holding Company LLC, Hopkinton, MA (US)

(72) Inventors: Yuval Harduf, Yahud (IL); Yuri Stotski, Saint Petersburg (RU); Chen Reichbach, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 93 days.

(21) Appl. No.: 17/699,444

(22) Filed: Mar. 21, 2022

(65) Prior Publication Data

US 2023/0004575 A1 Jan. 5, 2023

(30) Foreign Application Priority Data

Jun. 30, 2021 (RU) .................................. 2021119017

(51) Int. Cl.
G06F 16/27 (2019.01)
G06F 16/23 (2019.01)

(52) U.S. Cl.
CPC .......... G06F 16/27 (2019.01); G06F 16/2343 (2019.01)

(58) Field of Classification Search
CPC ............................. G06F 16/27; G06F 16/2343
USPC ....................................................... 707/634
See application file for complete search history.

(56) References Cited

U.S. PATENT DOCUMENTS

| | | | | |
|---|---|---|---|---|
| 8,301,812 B1 * | 10/2012 | Riordan | ............ | G06F 13/4022 709/239 |
| 8,832,325 B1 * | 9/2014 | George | ................. | G06F 3/067 710/21 |
| 8,880,821 B1 * | 11/2014 | Li | ........................ | G06F 3/067 711/170 |
| 9,971,709 B1 * | 5/2018 | Long | ..................... | G06F 3/067 |
| 10,409,838 B1 * | 9/2019 | George | ................ | G06F 3/0635 |

FOREIGN PATENT DOCUMENTS

RU 2021-111369 4/2021

OTHER PUBLICATIONS

U.S. Appl. No. 17/675,737, filed Feb. 18, 2022 Stotski, et al.

* cited by examiner

*Primary Examiner* — Michael Pham
(74) *Attorney, Agent, or Firm* — Muirhead and Saturnelli, LLC

(57) ABSTRACT

Techniques for processing commands may include: initially synchronizing a target database of volume reservation and registration information with a source database of volume reservation and registration information; while initially synchronizing the target database with the source database, enabling volume reservation and registration command processing on both a first node managing the source database and a second node managing the target database; while initially synchronizing the target database with the source database, performing first processing to service a first command that is any of a reservation command and a registration command for a first volume; and after initially synchronizing the target database with the source database, using the target database of the second node when servicing reservation and registration commands received at both the first node and the second node.

18 Claims, 9 Drawing Sheets

TECHNIQUES FOR REPLICATING MANAGEMENT DATA

BACKGROUND

Technical Field

This application generally relates to data storage.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for processing commands comprising: initially synchronizing a target database of volume reservation and registration information with a source database of volume reservation and registration information; while initially synchronizing the target database with the source database, enabling volume reservation and registration command processing on both a first node managing the source database and a second node managing the target database; while initially synchronizing the target database with the source database, performing first processing to service a first command that is any of a reservation command and a registration command for a first volume; and after initially synchronizing the target database with the source database, using the target database of the second node when servicing reservation and registration commands received at both the first node and the second node.

In at least one embodiment, the first command may be received at the second node and forwarded to the first node for servicing. The first processing may include: acquiring a first lock for reservation and registration information for the first volume, wherein the first lock provides a holder of the first lock with exclusive access to reservation and registration information for the first volume as stored in the source database; and responsive to acquiring the first lock for reservation and registration information for the first volume, performing second processing comprising: updating the source database managed by the first node with any of reservation and registration information for the first volume in accordance with the first command. The second processing may include updating an in-memory copy of the source database on the first node with any of reservation and registration information for the first volume in accordance with the first command. The second processing may include: determining whether initial synchronization of the source database and the target database is complete for the first volume; and responsive to determining the initial synchronization of the source database and the target database is not complete for the first volume, performing third processing comprising: determining a first update for the target database, wherein the first update includes first volume reservation and registration information in accordance with the first command and includes existing reservation and registration information for the first volume stored in the source database; sending the first update from the first node to the second node; applying the first update to the target database of the second node and to an in-memory copy of the target database; and marking initial synchronization of the source database and the target database as complete for the first volume.

In at least one embodiment, responsive to determining the initial synchronization of the source database and the target database is complete for the first volume, third processing may be performed comprising: determining a second update for the target database, wherein the second update includes the first volume reservation and registration information in accordance with the first command and does not include the existing reservation and registration information for the first volume stored in the source database; sending the second update from the first node to the second node; and applying the second update to the target database of the second node and to an in-memory copy of the target database.

In at least one embodiment, the first volume may be one of a plurality of volumes, the plurality of volumes may have a plurality of locks, wherein each of the plurality of volumes may have a corresponding one of the plurality of locks that is acquired to obtain exclusive access to volume reservation and registration information in the source database for said each volume, and wherein each of the plurality of locks may be associated with one of a plurality of queues that holds requests for said each lock that are blocked waiting to acquire said each lock.

In at least one embodiment, for each of the plurality of volumes, fourth processing may be performed comprising: acquiring one of the plurality of locks for said each volume; determining whether initial synchronization of the source database and the target database is complete for the said each volume; responsive to determining the initial synchronization of the source database and the target database is not complete for said each volume, performing fifth processing comprising: determining a corresponding update for the target database, wherein the corresponding update includes existing reservation and registration information for said each volume stored in the source database; sending the corresponding update from the first node to the second node; applying the corresponding update to the target database of the second node and to an in-memory copy of the target database; and marking initial synchronization of the source database and the target database as complete for said each volume; and releasing said one lock for said each volume.

In at least one embodiment, the first processing may include determining whether the first lock for reservation and registration information for the first volume is taken; and responsive to determining the first lock is taken, placing a first request for the first lock in a first queue associated with the first lock, wherein the first request is associated with the first command. Responsive to releasing the first lock, processing may include selecting the first request of the first queue for processing and performing said acquiring of the first lock for reservation and registration information for the first volume. Initially synchronizing a target database of volume reservation and registration information with a source database of volume reservation and registration information may be performed as part of an upgrade process that upgrades software of the first node and the second node.

In at least one embodiment, the second processing may include: determining whether initial synchronization of the source database and the target database is complete for the first volume; responsive to determining the initial synchronization of the source database and the target database is complete for the first volume, performing third processing comprising: determining a first update for the target database, wherein the first update includes first volume reservation and registration information in accordance with the first command; sending the first update from the first node to the second node; applying the first update to the target database of the second node and to an in-memory copy of the target database; and releasing the first lock.

In at least one embodiment, the first volume may be one of a plurality of volumes, the plurality of volumes may have a plurality of locks, wherein each of the plurality of volumes may have a corresponding one of the plurality of locks that is acquired to obtain exclusive access to volume reservation and registration information in the source database for said each volume, and wherein each of the plurality of locks may be associated with one of a plurality of queues that holds requests for said each lock that are blocked waiting to acquire said each lock. For each of the plurality of volumes, fourth processing may be performed including: acquiring one of the plurality of locks for said each volume; determining a corresponding update for the target database, wherein the corresponding update includes existing reservation and registration information for said each volume stored in the source database; sending the corresponding update from the first node to the second node; applying the corresponding update to the target database of the second node and to an in-memory copy of the target database; and marking initial synchronization of the source database and the target database as complete for said each volume; and releasing said one lock for said each volume.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
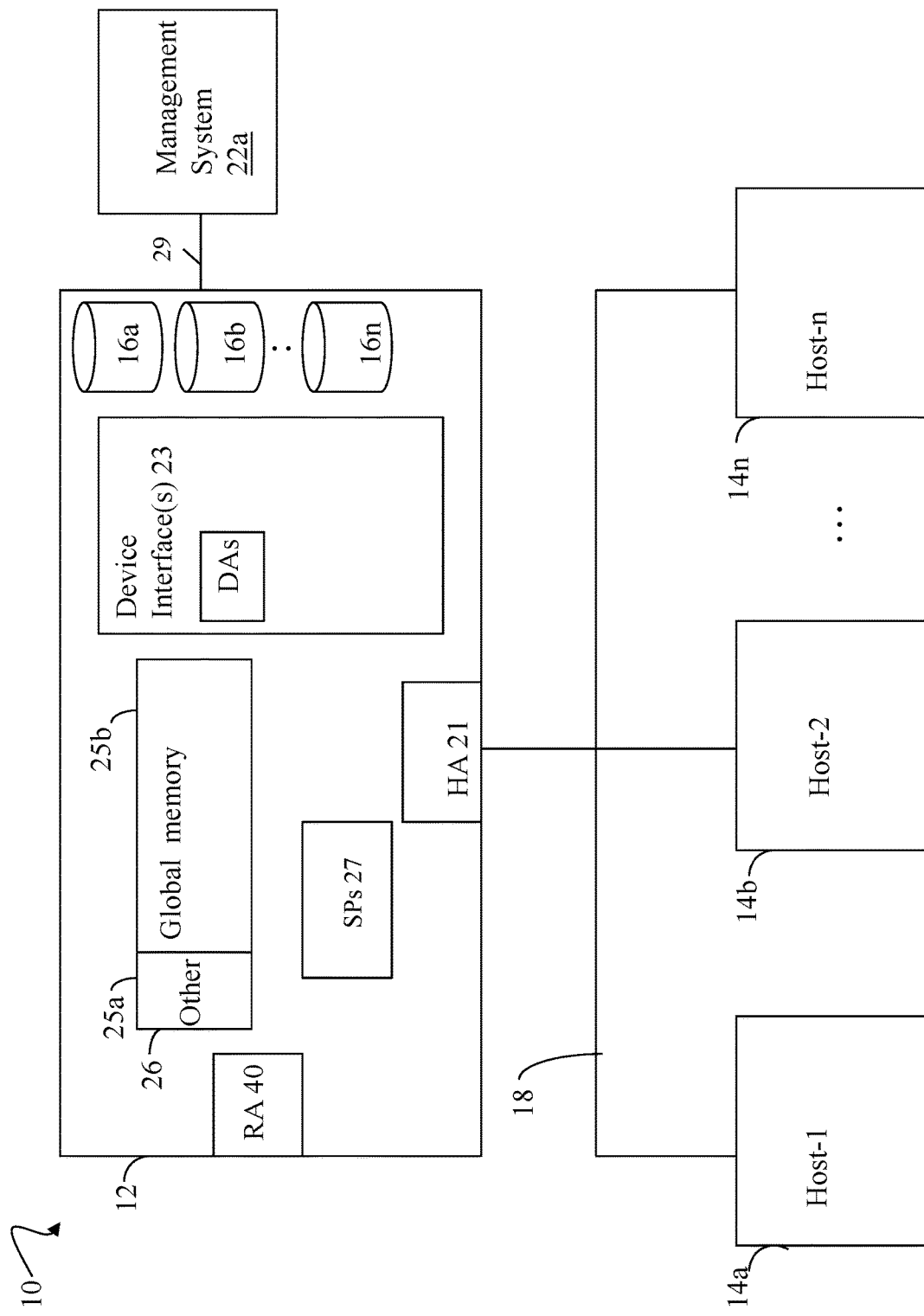
FIG. 1 is an example of components that may be included in a system in accordance with the techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 may be connected to the communication medium 18 may pass through other communication devices, such as switching equipment, a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although the element 12 is illustrated as a single data storage system, such as a single data storage array, the element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of controllers, adapters or directors, such as an HA 21 (host adapter), RA 40 (remote adapter), and/or device interface(s) 23. Each of the adapters (sometimes also known as controllers, directors or interface components) may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage device interfaces 23 may include device interface modules, for example, one or more disk adapters (DAs) (e.g., disk controllers) for interfacing with the flash drives or other physical storage devices (e.g., PDS 16a-n). The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, the HAs and/or the RAs in a data storage array. In one embodiment, the device interfaces 23 may perform data operations using a system cache that may be included in the global memory 25b, for example, when communicating with other device interfaces and other components of the data storage array. The other portion 25a is that portion of the memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may include one or more type of device interface used in connection with facilitating data transfers to/from the associated disk drive(s) and LUN (s) residing thereon. For example, such device interfaces may include a device interface used in connection with facilitating data transfers to/from the associated flash devices and LUN(s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

Information regarding the data storage system configuration may be stored in any suitable data container, such as a database. The data storage system configuration information stored in the database may generally describe the various physical and logical entities in the current data storage system configuration. The data storage system configuration information may describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule or other trigger conditions of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

Consistent with other discussion herein, management commands issued over the control or data path may include commands that query or read selected portions of the data storage system configuration, such as information regarding the properties or attributes of one or more LUNs. The management commands may also include commands that write, update, or modify the data storage system configuration, such as, for example, to create or provision a new LUN (e.g., which may result in modifying one or more database tables such as to add information for the new LUN), to modify an existing replication schedule or configuration (e.g., which may result in updating existing information in one or more database tables for the current replication schedule or configuration), to delete a LUN (e.g., which may include deleting the LUN from a table of defined LUNs and may also include modifying one or more other database tables to delete any existing snapshots of the LUN being deleted), and the like.

It should be noted that each of the different controllers or adapters, such as each HA, DA, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, the techniques herein may be used in connection with any suitable storage system, appliance, device, and the like, in which data is stored. For example, an embodiment may implement the techniques herein using a midrange data storage system, such as a Dell EMC Unity® data storage system or a Dell EMC PowerStore® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on the management system 22a to the data storage system 12. Such commands may be, for example, to establish or modify data services, provision storage, perform user account management, and the like. Consistent with other discussion herein, the management commands may result in processing that includes reading and/or modifying information in the database storing data storage system configuration information. For example, management commands that read and/or modify the data storage system configuration information in the database may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

Figure 2:
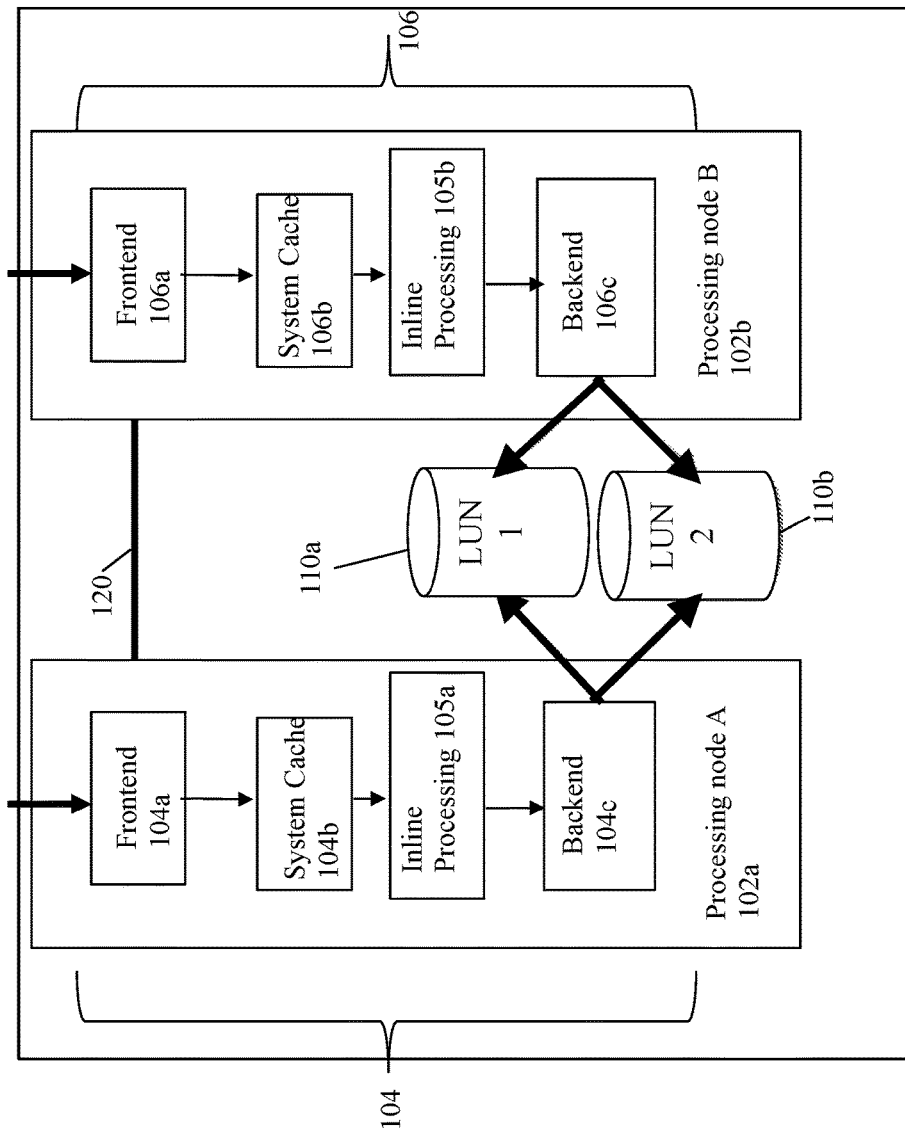
FIG. 2 is an example illustrating the I/O path or data path in connection with processing data in an embodiment in accordance with the techniques herein.

With reference to the FIG. 2, shown is an example 100 illustrating components that may be included in the data path in at least one existing data storage system in accordance with the techniques herein. The example 100 includes two processing nodes A 102a and B 102b and the associated software stacks 104, 106 of the data path, where I/O requests may be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing may be performed by layer 105a. Such inline processing operations of 105a may be optionally performed and may include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing may include, for example, performing one or more data reduction operations such as data deduplication or data compression. The inline processing may include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O may be directed to a location or logical address of a LUN and where data may be read from, or written to, the logical address. The LUNs 110a, 110b are examples of storage objects representing logical storage entities included in an existing data storage system configuration. Since, in this example, writes directed to the LUNs 110a, 110b may be received for processing by either of the nodes 102a and 102b, the example 100 illustrates what may also be referred to as an active-active configuration.

In connection with a write operation as may be received from a host and processed by the processing node A 102a, the write data may be written to the system cache 104b, marked as write pending (WP) denoting it needs to be written to the physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations may be performed. For example, the inline processing may include performing data compression processing, data deduplication processing, and the like, that may convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b may be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 may be used for internode communication between the nodes 102a, 102b.

In connection with at least one embodiment in accordance with the techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. The processor cache may be substantially faster than the system RAM such as used as main memory and contains information that the processor will be immediately and repeatedly accessing. The faster memory of the CPU cache may, for example, run at a refresh rate that's closer to the CPU's clock speed, which minimizes wasted cycles. In at least one embodiment, there may be two or more levels (e.g., L1, L2 and L3) of cache. The CPU or processor cache may include at least an L1 level cache that is the local or private CPU cache dedicated for use only by that particular processor. The two or more levels of cache in a system may also include at least one other level of cache (LLC or lower level cache) that is shared among the different CPUs. The L1 level cache serving as the dedicated CPU cache of a processor may be the closest of all cache levels (e.g., L1-L3) to the processor which stores copies of the data from frequently used main memory locations. Thus, the system cache as described herein may include the CPU cache (e.g., the L1 level cache or dedicated private CPU/processor cache) as well as other cache levels (e.g., the LLC) as described herein. Portions of the LLC may be used, for example, to initially cache write data which is then flushed to the backend physical storage such as BE PDs providing non-volatile storage. For example, in at least one embodiment, a RAM based memory may be one of the caching layers used as to cache the write data that is then flushed to the backend physical storage. When the processor performs processing, such as in connection with the inline processing 105a, 105b as noted above, data may be loaded from the main memory and/or other lower cache levels into its CPU cache.

In at least one embodiment, the data storage system may be configured to include one or more pairs of nodes, where each pair of nodes may be generally as described and represented as the nodes 102a-b in the FIG. 2. For example, a data storage system may be configured to include at least one pair of nodes and at most a maximum number of node pairs, such as for example, a maximum of 4 node pairs. The maximum number of node pairs may vary with embodiment. In at least one embodiment, a base enclosure may include the minimum single pair of nodes and up to a specified maximum number of PDs. In some embodiments, a single base enclosure may be scaled up to have additional BE non-volatile storage using one or more expansion enclosures, where each expansion enclosure may include a number of additional PDs. Further, in some embodiments, multiple base enclosures may be grouped together in a load-balancing storage cluster or federation to provide up to the maximum number of node pairs. Consistent with other discussion herein, each node may include one or more processors and memory. In at least one embodiment, each node may include two multi-core processors with each processor of the node having a core count of between 8 and 28 cores. In at least one embodiment, the PDs may all be non-volatile SSDs, such as flash-based storage devices and storage class memory (SCM) devices. It should be noted that the two nodes configured as a pair may also sometimes be referred to as peer nodes. For example, the node A 102a is the peer node of the node B 102b, and the node B 102b is the peer node of the node A 102a.

In at least one embodiment, the data storage system may be configured to provide both block and file storage services with a system software stack that includes an operating system running directly on the processors of the nodes of the system.

In at least one embodiment, the data storage system may be configured to provide block-only storage services (e.g., no file storage services). A hypervisor may be installed on each of the nodes to provide a virtualized environment of virtual machines (VMs). The system software stack may execute in the virtualized environment deployed on the hypervisor. The system software stack (sometimes referred to as the software stack or stack) may include an operating system running in the context of a VM of the virtualized environment. Additional software components may be included in the system software stack and may also execute in the context of a VM of the virtualized environment.

In at least one embodiment, each pair of nodes may be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes may not be shared with other pairs of nodes. A host may access data stored on a BE PD through the node pair associated with or attached to the PD.

In at least one embodiment, each pair of nodes provides a dual node architecture where both nodes of the pair may be identical in terms of hardware and software for redundancy and high availability. Consistent with other discussion herein, each node of a pair may perform processing of the different components (e.g., FA, DA, and the like) in the data path or I/O path as well as the control or management path. Thus, in such an embodiment, different components, such as the FA, DA and the like of FIG. 1, may denote logical or functional components implemented by code executing on the one or more processors of each node. Each node of the pair may include its own resources such as its own local (i.e., used only by the node) resources such as local processor(s), local memory, and the like.

In connection with the SCSI standard, a path may be defined between two ports as described above. A command may be sent from the host (as well as a component thereof such as a HBA) and may be characterized as an initiator, originator or source with respect to the foregoing path. The host, as the initiator, sends requests to a data storage system (as well as a particular component thereof such as node having a port with a network address) characterized as a target, destination, receiver, or responder. Each physical connection of a path may be between a first endpoint which is an initiator port (e.g., I1) of the host and a second endpoint (e.g., T1) which is a target port of node in the data storage system. Over each such path, one or more LUNs may be visible or exposed to the host initiator through the target port of the data storage system.

In connection with some protocols such as the SCSI protocol, each path as related to sending and receiving of I/O commands may include 2 endpoints. As discussed herein, the host, or port thereof, may be an initiator with respect to I/Os issued from the host to a target port of the data storage system. In this case, the host and data storage system ports are examples of such endpoints. In the SCSI protocol, communication may be unidirectional in that one of the endpoints, such as the host HBA port, is the initiator and the other endpoint, such as the data storage system target port, is the target receiving the commands from the initiator.

An I/O command or operation, such as a read or write operation, from the host to the data storage system may be directed to a LUN and a logical address or location in the LUN's logical address space. The logical address or location of the LUN may be characterized as the target logical address of the I/O operation. The target logical address or location of the I/O operation may identify a LBA within the defined logical address space of the LUN. The I/O command may include various information such as identify the particular type of I/O command as read or write, identify the target logical address (e.g., LUN and LUN logical address) of the I/O command, and other information. In connection with servicing the I/O operation, the data storage system may map the target logical address to a physical storage location on a PD of the data storage system. The physical storage location may denote the physical storage allocated or provisioned and also mapped to the target logical address.

In at least one existing data storage system or appliance, a non-disruptive upgrade (NDU) may be performed to upgrade the system or appliance. The NDU may be performed, for example, to upgrade software of the system or appliance on both the nodes A and B. With a NDU in a dual node system, the upgrade may be performed while also allowing I/Os to be serviced from the hosts or other external clients sending the I/Os to the system. For example in at least one existing dual node system being upgraded, a first node A may be upgraded and during this upgrade process of node A, node A may be offline and unavailable to service I/Os. However, while node A is offline and being upgraded, the remaining peer node B may handle all I/Os. Once node A upgrade has completed, node A reboots and once again is available online to service I/Os. Subsequent to the upgraded node A rebooting and being available online to service I/Os, the node B may be similarly upgraded. During the upgrade of node B, the node B is offline and unavailable to service I/Os. During the upgrade of node B, the node A may handle all I/Os directed to all volumes or LUNs. Once node B upgrade has completed, node B reboots and once again is available online to service I/Os. At this point, both of the nodes A and B have been upgraded and may be online and available to service I/Os.

During the NDU processing, an old or existing PRR (persistent reservation and registration) DB includes persistently stored registration and reservation information, where the old PRR DB may be initially synchronized or copied to a new PRR DB that may be used subsequent to completion of the NDU. Subsequent to completion of the NDU, the old or existing PRR DB may be removed or discarded and no longer utilized whereby the new PRR DB may remain the single persistent PRR DB used by both nodes of the appliance or data storage system.

As part of this initial synchronization or copying of the old PRR DB to the new PRR DB, all existing registration and reservation information of the existing PRR DB may be copied to the new PRR DB. In at least one embodiment having a dual node appliance or data storage system, the old PRR DB may be on a first of the two nodes of the appliance, and the new PRR DB may be on the remaining second peer node of the appliance. The second node may already be upgraded from an existing software version to use a new version of software in comparison to the first node having the existing older version of software. The old or existing PRR DB may be on the first node with the existing older software, and the new PRR DB may be on the second node with the upgraded new version of the software.

In at least one existing system during this initial synchronization of the old PRR DB and the new PRR DB, the entire PRR DB may be locked whereby no new reservation or registration commands are serviced. During this time while the PRR DB is locked, a host issuing a registration or reservation command receives an error, such as, for example, a busy reply indicating a recoverable error whereby the host may subsequently retry the registration or reservation command. Additionally, during the time while the DB is locked, I/O command processing, such as reads and writes, may be disabled. During this time while the DB is locked, a host issuing an I/O command to a LUN may receive an error, such as, for example, a recoverable error message whereby the host may subsequently retry the I/O command.

The amount of time it takes to complete the initial synchronization of the old PRR DB and the new PRR DB varies, for example, with the size of the old PRR DB. Depending on the size of the old PRR DB, the amount of time it takes to complete the initial synchronization may result in data unavailability for a host and result in the host timing out. For example, the host may repeatedly resend reservation, registration and/or I/O commands and also repeatedly receive error replies, where the host commands are unable to be serviced for a continuous amount of time exceeding a timeout maximum threshold.

Described in the following paragraphs are techniques that may be used to perform the initial synchronization of the old PRR DB and the new PRR DB in an efficient manner. In at least one embodiment, the initial synchronization of the old PRR DB and the new PRR DB may be performed as part of the NDU on a data storage system or appliance. More generally the techniques described herein may be used in connection with other applications or uses and are not limited to the NDU or upgrade processing. Additionally, the techniques herein may be used in connection with other types of information and is not limited to use with the reservation and registration information.

The techniques herein provide for the initial synchronizing or copying the old PRR DB to the new PRR DB, or more generally, a source DB or data source to a target DB or data target. In at least one embodiment, the source DB may include reservation and registration information for LUNs or volumes on the data storage system, where the synchronization includes copying the existing reservation and registration information from the source DB to the target DB. In at least one embodiment, the techniques herein may perform the synchronization without locking the entire source DB, without blocking or disabling all I/Os, and without blocking or disabling all reservation and reservation command servicing.

In at least one embodiment, reservation and registration information may be copied or synchronized from the source DB to the target DB on a per LUN or volume basis. In at least one embodiment, a list of all existing LUNs may be traversed sequentially. In the traversal of all existing LUNs, a lock may be taken on each individual LUN, one at a time, having information to be copied from the source DB to the target DB. In at least one embodiment, processing may be performed to initially synchronize volume registration and reservation information for each single volume or LUN before proceeding with a next volume or LUN. In this manner in at least one embodiment, only a single volume lock may be held at a time for initially synchronizing volume registration and reservation information. While the volume or LUN lock is held and the corresponding LUN's reservation and registration information is being copied from the source DB to the target DB, other reservation and registration commands for other volumes that are not locked may be serviced. While the volume or lock of the corresponding LUN is held during the foregoing initial synchronization for the corresponding LUN, any received reservation or registration command for the corresponding LUN may be queued for subsequent processing when the volume or lock for the corresponding LUN is released or unlocked. In at least one embodiment, the queue may maintain a time order in which the commands are placed on the queue. In response to the lock for the LUN being released, the queued reservation and/or registration commands for the LUN's lock may be processed in accordance with the time order in which they were placed on the queue. When a request (e.g., queued reservation or registration command) for the lock is removed from the queue for processing and acquires the lock, the request processing may resume from the point in executing code which triggered the queuing of the request. In at least one embodiment, the temporarily blocked commands placed on the queue for the LUN's lock may be an alternative used rather than sending an error reply, such as a busy reply noted above, to the requesting host.

In the following paragraphs, the lock for a corresponding LUN X may be referred to as the PRR lock for the LUN X to denote the lock that may be acquired to provide exclusive access to the PRR DB in order to update the PRR DB with reservation and/or registration information for the LUN X. Thus, prior to updating the old and/or new PRR DB with information regarding LUN X, the PRR lock for LUN X is acquired. Subsequent to completing the desired updates for LUN X, the PRR lock for LUN X may be unlocked or released.

In at least one embodiment, the initial synchronization of volume registration and reservation information for a LUN may be performed on demand in response to one or more trigger events. For example, in at least one embodiment, a first process or thread, such as an initial synchronization process or thread, may traverse a list of all LUNs of a data storage system to perform the initial synchronization of volume registration and reservation information for the LUNs. Additionally, the occurrence of one of the defined trigger event(s) may result in initially synchronizing the volume registration and reservation information for a LUN on demand and out of order rather than having the first process or thread complete the initial synchronization of the volume registration and reservation information for the LUN. In at least one embodiment, a trigger event may be receiving a registration or reservation command directed to a particular LUN prior to the first process or thread initially synchronizing the volume registration and reservation information for the particular LUN. In response to receiving the command, both the old and new PRR DBs may be updated in accordance with the received command. Additionally, the initial synchronization of the volume registration and reservation information for the particular LUN may be performed, if such initial synchronization for the particular LUN has not yet been performed. In this manner, the received command results in completing the initial synchronization of the volume registration and reservation information for the particular LUN along with updating the old and new PR DBs based on the received command. In this manner, completing the initial synchronization of the volume registration and reservation information for the particular LUN may be performed responsive to receiving the registration or reservation command directed to the particular LUN.

In at least one embodiment, initial synchronization of the volume registration and reservation information for a LUN may be performed on demand in response to one or more trigger events whereby the initial synchronization is performed prior to when it would have otherwise been performed by the above-noted first process or thread traversing the list of LUNs. As another example, in at least one embodiment, receiving an I/O operation directed to a LUN at a node including the target or new PRR DB may trigger initially synchronizing the volume registration and reservation information for the LUN whereby the initial synchronization is performed prior to when it would have otherwise been performed by the above-noted first process or thread traversing the list of LUNs.

In at least one embodiment, initial synchronization of the volume registration and reservation information for a LUN may not be performed on demand in response to a trigger even such as, for example, in response to receiving a registration or reservation command for the LUN. In such an embodiment, the above-noted first process or thread, such as the initial synchronization process or thread, may traverse a list of all LUNs of a data storage system to perform the initial synchronization of volume registration and reservation information for the LUNs. Upon receipt of a registration or reservation command directed to a LUN for which initial synchronization has not been performed, the command may be applied only to the old or source PRR DB and not applied to the new or target PRR DB. Upon receipt of a registration or reservation command directed to a LUN for which initial synchronization has been performed, the command may be applied to both the old or source PRR DB and the new or target PRR DB.

In at least one embodiment of a dual node appliance or system, one of the nodes including the source or old PRR DB may be designated as the primary node and the other node including the target or old PRR DB may be designated as the secondary node. Registration and reservation commands received prior to completing the initial synchronization of volume registration and reservation for all LUNs in the system may be directed to the primary node including the source or old PRR DB. In this manner, a registration or reservation command received at the secondary node including the new or target PRR DB prior to completing the initial synchronization of all LUNs may be directed to the primary node including the source or old PRR DB. In at least one embodiment, such reservation and registration commands may be directed to a central PRR processing module or component of the primary node including the old PRR DB.

In at least one embodiment, initially synchronizing the volume registration and reservation information for a LUN from an old PRR DB to a new PRR DB may include copying all existing registration and reservation information from the old PRR DB to the new PRR DB. Additionally, the new PRR DB may be initialized so that any existing registration and reservation information in the new PRR DB is removed.

In the following paragraphs, the techniques herein may refer to a SCSI based protocol, such as FC or iSCSI. However, the stretched volume and the techniques described in the following paragraphs may also be used in embodiments using other suitable protocols such as, for example, NVMe.

The foregoing and other aspects of the techniques herein are described in more detail in the following paragraphs.

Before further describing embodiments of the techniques herein, presented is an initial discussion of information that may be included in volume metadata or MD (in some contexts sometimes referred to herein as simply MD) as well as various commands that may be used in connection with querying and modifying the volume MD. Consistent with discussion herein, the volume MD for a LUN or volume may include registration and/or reservation information for the LUN as may be stored in a PRR DB. Examples in the following paragraphs may be in accordance with a particular protocol and standard, such as the SCSI protocol and standard. However, other suitable protocols and standards, such as NVMe, may be used in connection with the techniques herein, wherein such other protocols and standard may have similar concepts, commands and information included in volume MD.

One example of volume MD includes SCSI reservation and registration information. For example, SCSI-2 and SCSI-3 are versions of the SCSI standard that support device registrations and reservations and have various commands that perform operations affecting device registrations and reservations. For example, SCSI-3 has persistent reservation (PR) commands. Commands used in connection with reservation and registration information may include commands that, for example, perform a registration, read information regarding existing registrations, perform a reservation, perform a clear operation to clear a reservation, perform a release to release a reservation, remove a registration, update or modify an existing registration, and perform processing to preempt a reservation.

SCSI PR uses the concepts of registrations and reservations. PRs allow multiple hosts, or more generally multiple initiators, to communicate with a target by tracking multiple initiator-to-target relationships called I_T nexuses. An I_T nexus is a relationship between a specific SCSI initiator port (I) and a specific SCSI target port (T) for a given LUN within the SCSI target. It should be noted that following examples may refer to SCSI PR commands such as in a SCSI-3 based system. However, similar commands and/or operations may be performed in other embodiments based on other versions of the SCSI standard which also affect reservation state information.

As a first step in setting up a PR, registration may be performed using Reservation Key, also more generally referred to herein as simply a "key". A key may generally be any suitable value, such as a numeric value. Each host system that participates registers a key with each volume or LUN over each path (e.g., each initiator (I) and target port (T) pairing) over which each particular volume or LUN is accessible to the host. For example, reference is made to FIG. 3. The example 200 includes the data storage system 210 which is a dual node appliance including the nodes 202 and 204. The node A 202 includes the target ports T1 and T2; and the node B 204 includes the target ports T3 and T4. The example 200 also includes the hosts 212 and 214. The host 212 includes the initiator ports I1 and I2; and the host 214 includes the initiator ports I3 and I4.

The LUN A 206 may be exposed over the target ports T1-T4 of the system 210. In particular, the LUN A2 206 may be exposed to the host 1 212 over the 2 paths: I1-T1 220a and I2-T3 220b, where the host 212 may register its key, K1, over each of the foregoing 2 paths to access the LUN A 206. In a similar manner, the LUN A 206 may be exposed to the host 2 414 over the 2 paths: I3-T2 220c and I4-T4 220d, where the host 214 may register its key, K2, over each of the foregoing 2 paths to access the LUN A 206. Although each of the hosts 212, 214 are described for illustration purposes as using different keys, more generally, hosts may use the same or different keys. In such a system where each host registers with a different key over all its own paths to the same LUN, all registrations having the same key may denote all paths from a particular host to the LUN.

As a result of the hosts 212, 214 each registering their respective keys over their respective paths noted above, the data storage system 210 may include the following set of registration information for the LUN A 206 in the Table 1:

TABLE 1

Registration information for LUN A 206 on the data storage system 210:

| Volume/LUN | Key | Init ID | Target ID |
|---|---|---|---|
| A | K1 | I1 | T1 |
| A | K1 | I2 | T3 |
| A | K2 | I3 | T2 |
| A | K2 | I4 | T4 |

In at least one embodiment, registration of the PR keys as illustrated in the Table 1 may be performed by the hosts 210, 212 as part of discovery processing whereby various volumes or LUNs and connections visible or accessible to the hosts are discovered. As part of host discovery processing, each of the hosts may register a key for each LUN accessible to the host over each path which the LUN is accessible. In an embodiment in which each host uses its own set of one or more keys, a Reservation Key may be registered for each I_T nexus (each I-T over which a LUN is accessible to the initiator I) and includes the necessary information to allow the authentication of the I_T nexus devices in order to control the reservations.

The information in Table 1 may denote the set of registration information included in the volume MD for the LUN A. In at least one embodiment, the MD for the LUN A, where the MD includes reservation and registration information, may be stored in the PRR DB 208. In the example 200, the information of the Table 1 above may be stored in the PRR DB 208.

An embodiment in accordance with techniques herein may provide support for the PR IN command to read or query registration and reservation information included in the volume MD of the PRR DB 208. It should be noted that an embodiment may include different command parameters with the PR IN command to request and vary the particular information provided and returned to the requesting initiator. For example, a PR IN command may include one or more parameters identifying the particular information to be returned. For example, the PR IN command may include one or more parameters requesting to return a complete set of all registration and reservation information of the databases, return only reservation information, return only registration (e.g., key information), return only registration and/or reservation information associated with a particular key, and the like. To further illustrate, assume subsequent to issuing 4 PR registration commands to register the keys for the hosts 212, 214 noted above in Table 1 the host 212 issues a PR IN command over the path I1-T1 220a to the system 210 requesting a list of all existing or active registrations and reservations with respect to a particular LUN, such as the volume or LUN A 206. Generally, the PR IN command is directed to a particular LUN and issued over one of the paths (from initiator to a target port) for which there is an existing registration for the LUN. In response to receiving the PR IN command over the path 220a for the volume or LUN A, the system 210 may query its PRR DB 208 for the requested reservation and registration information of the volume MD for the volume or LUN A 206. In response to the PR IN command, the system 210 may return the information as described above in Table 1. In a similar manner, issuing the same PR IN command regarding LUN A over any of the 4 paths 220a-d to the system 410 also results in returning the same information as described in Table 1. It should be noted that if there were also existing reservations (described elsewhere herein) with respect to LUN A 206, then information regarding such existing reservations may also be returned in response to the PR IN command described above.

In this manner, the requesting host 212 or initiator I11 may be presented with a complete view of registration and reservation information with respect to all paths to the volume or LUN A 206 by issuing the PR IN command directed to LUN A over any of the 4 active paths 220a-d exposing the LUN A 206.

Commands affecting or related to registrations and reservations, such as various ones of the PR commands, affect the ability of initiators and thus hosts to perform I/O with respect to different LUNs. For example, in connection with registrations with the SCSI standard, if there is no registration with respect to a particular I-T nexus (e.g., initiator and target port for a particular LUN), that initiator may at most be able to have read-only access to data of that LUN over the path from the initiator to the target port. As described below in more detail, an initiator may also issue other commands, such as a reservation command, which request a particular type of volume or LUN access and may block or modify access allowed by other initiators and hosts. Such other commands described in more detail in the following paragraphs may result in modifying or updating existing volume MD, such as for the LUN A 206.

In at least one embodiment in accordance with the SCSI standard, a PR reserve or reservation command may be issued over a path from a particular initiator to a particular target port and directed to a LUN (e.g. PR reservation may be made with respect to a particular LUN, initiator and target port). Additionally, the PR reserve or reservation command may include parameters such as, for example, a parameter that denotes a key of a previous PR registration, a parameter identifying an associated type of I/O access for the requested reservation, and possibly other parameters. For example, the type of I/O access parameter may be one of variety of different types of I/O access such as exclusive access (whereby no other initiator besides the current reservation holder having the exclusive access is allowed to issue any I/Os to the LUN), write exclusive access (whereby only the initiator holding the current reservation is allowed to issue writes but other initiators may issue read I/Os), and the like.

In at least one embodiment in accordance with the SCSI standard, the PR reservation command may be included in the broader category of PR OUT commands that generally change or modify volume MD associated with a particular volume or LUN.

To further illustrate, assume that the initiator I1 of the host 212 issues a PR reservation command for the LUN A 206 over the path I-T1 220a, where the PR reservation command requests write exclusive access so that only the initiator I11 holding the current reservation is allowed to issue writes but other initiators may issue read I/Os. In response to receiving the foregoing PR reservation command, the system 210 may update the volume MD for the LUN A 206 as included in the PRR DB 208 to also include an existing reservation for I1 for write exclusive access.

Once the reservation for exclusive write access for I1 to the LUN A 208 is completed as described above, a subsequent write I/O, such as from the host 2 214 over any of the paths 220c-d may result in an error due to the existing reservation for the LUN A 206 for the initiator I1.

In at least one embodiment in accordance with the SCSI standard, other commands that may modify volume MD may include a clear command that is a sub-command of the PROUT command and may be issued to a particular LUN to release or clear the persistent reservation (if any) and clear registrations for the particular LUN. Generally, depending on the particular embodiment, other parameters and criteria may be specified in connection with the clear command that affect the particular registrations and/or reservations cleared or removed for the LUN A 206.

In at least one embodiment in accordance with the SCSI standard, other commands that may modify volume MD related to registrations and reservations for a particular volume or LUN may include a release command that releases any active persistent reservation but does not remove the registrations for a particular LUN. In connection with the SCSI-3 standard, the release command is a sub-command of the PROUT command and is issued to a particular LUN to release or clear the persistent reservation (if any) from the LUN. Generally, depending on the particular embodiment, other parameters and criteria may be specified in connection with the release command that affect the particular registrations and/or reservations cleared or removed for the LUN A.

The foregoing are examples of some commands in connection with the SCSI protocol and standard that may be used in connection with a volume or LUN such as the LUN A 206. More generally, other commands may be supported and the particular examples provided herein are illustrative and not meant to be limiting.

Figure 4:
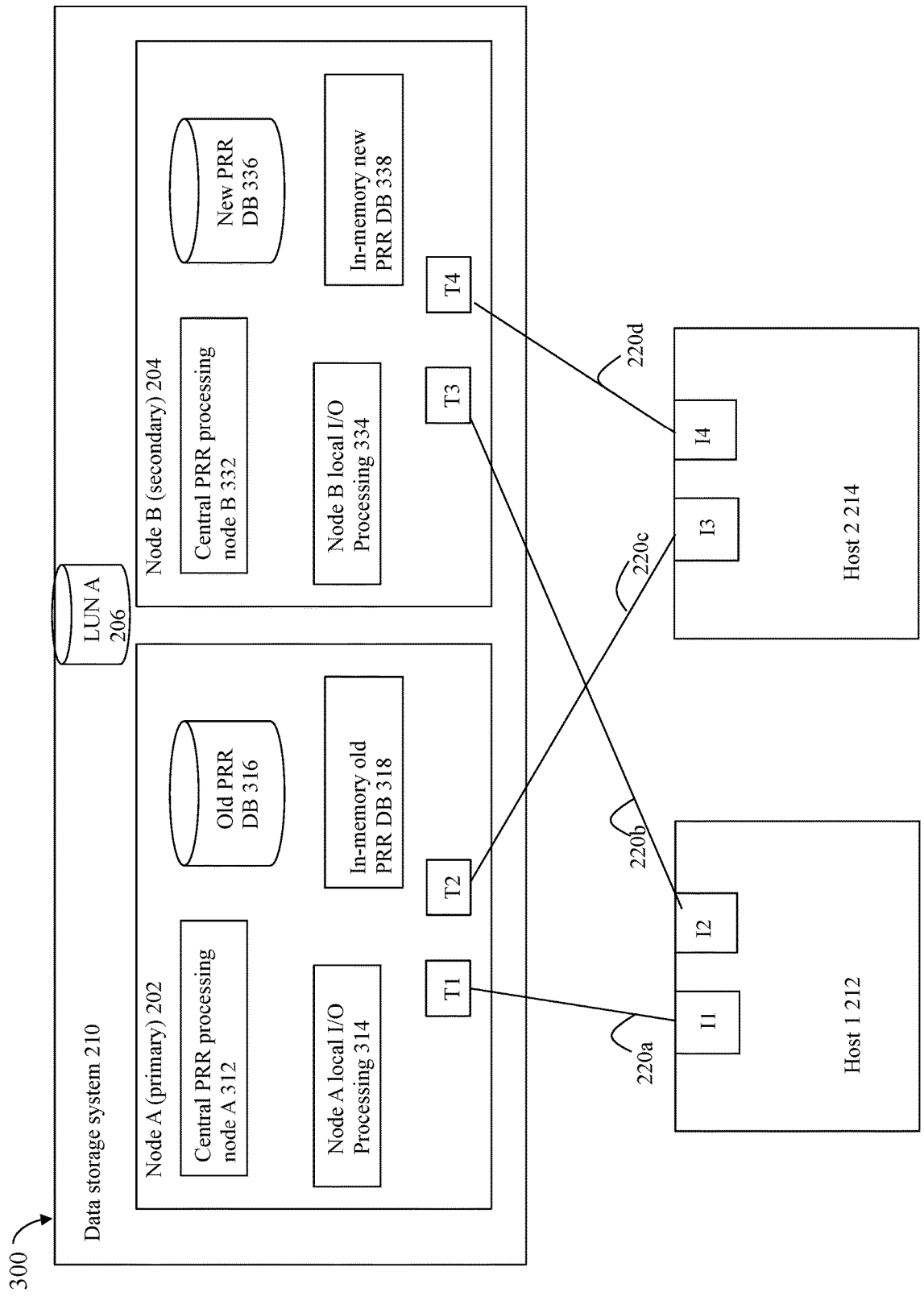

Referring to FIG. 4, shown is an example of components that may be used in an embodiment of a dual node appliance or system in accordance with the techniques herein.

Figure 3:
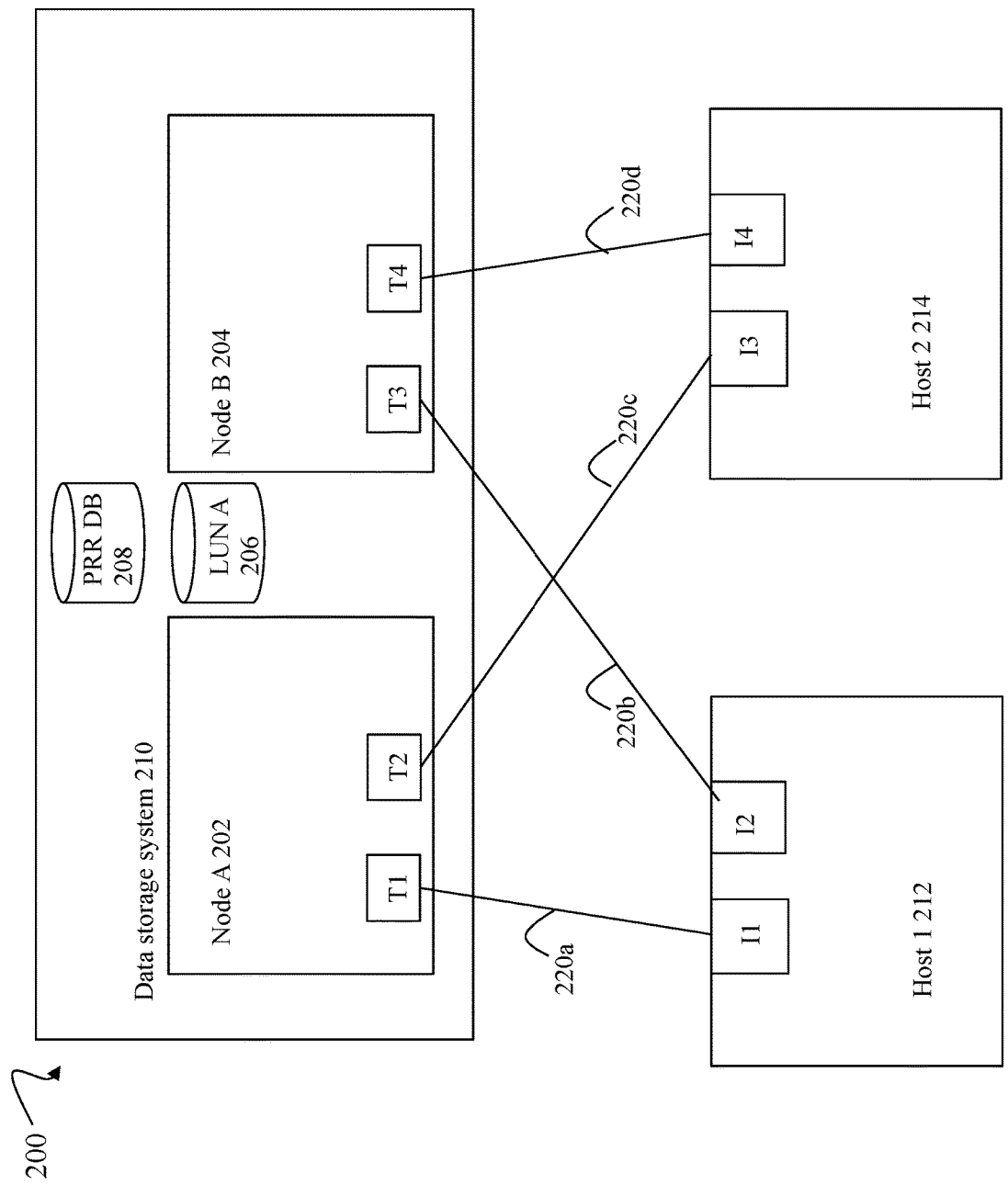
FIGS. 3 and 4 are examples of components and systems that may be used in performing the techniques herein.

The example 300 includes the appliance or data storage system 210 that is a dual node appliance as described elsewhere herein such as in connection with FIG. 3. The system 210 includes the nodes 202 and 204, where the node 202 may be designated as the primary node and the node 204 may be designated as the secondary node. The primary node A 202 mat include a central PRR processing module 312, the old PRR DB 316, a local I/O processing module 314, and an in-memory copy of the old PRR DB 318. The secondary node 204 may include a central PRR processing module 332, the new PRR DB 336, a local I/O processing module 334, and an in-memory copy of the new PRR DB 338. The primary node A 202 also includes the target ports T1 and T2, and the node B 204 includes the target ports T3 and T4. The LUN A 206 may be exposed over the target ports T1-T4, and in particular, over the paths 220*a-d* to the hosts 212, 214.

The roles of primary node and secondary node as noted in FIG. 4 are with respect to the initial synchronization processing performed in accordance with the techniques herein to initially synchronize the old PRR DB 316 with the new PRR DB 336. The primary node may include the old PRR DB 316 used to initialize the new PRR DB 336 where the registration and reservation information included in the old PRR DB 316 is copied to the new PRR DB 336.

The central PRR processing 312 of the node A, the primary node, may be a software component that receives all reservation and registration commands or requests from all target ports of the system 210. In particular, the module 312 may receive and process all reservation and registration commands received from the hosts 212, 214 at any target ports T1-T4 of the nodes 202, 204. If a registration or reservation command is received at T3 or T4 of the node B 204, the command is redirected to the central PRR processing module 312 of the node A for processing. If a registration or reservation command is received at T1 or T2 of the node A 202, the command is directed to the central PRR processing module 312 of the node A for processing. The module 312 may maintain and update the old PRR DB 316 denoting a persistently stored DB of reservation and registration information. The module 312 may maintain consistency of the reservation and registration information of the old PRR DB 316 and the corresponding in-memory copy of the old PRR DB 318. The in-memory copy of the old PRR DB 318 may denote a local in-memory copy of the old PRR DB 316 stored in memory local to the node 202. In this manner, the node A may use the in-memory copy 318 of the old PRR DB 316, for example, to determine whether to process a received read or write operation directed to a particular LUN in accordance with existing reservation information for the LUN. For example, a write command may be received at the node A 202 from the host 212 over the path I1-T1 where the write is directed to the LUN A 206. The node A, in particular, the local I/O processing module 314, may use the in-memory copy 318 of the PRR DB to determine whether there is an existing reservation, for example, by another initiator other than I1 that would result in the node A rejecting (e.g., not servicing) the write and resulting in an error being returned to the host 212. In at least one embodiment, the local I/O processing module 314 may perform processing to service received I/O commands, such as read and/or write commands, directed to LUNs exposed over T1 and T2. The module 314 may use the information in the in-memory copy of the PRR DB 318 as noted above.

The central PRR processing 332 of the node B, the secondary node, may be a software component that communicates with the central PRR processing module 312 of the primary node in performing processing in accordance with the techniques described herein. The module 332 may maintain and update the new PRR DB 336 denoting a persistently stored DB of reservation and registration information. The module 332 may maintain consistency of the reservation and registration information of the new PRR DB 336 and the corresponding in-memory copy 338 of the new PRR DB 336. The in-memory copy 338 of the new PRR DB 336 may denote a local in-memory copy of the new PRR DB 336 stored in memory local to the node B 204. In this manner, the node B may use the in-memory copy 338 of the new PRR DB 336, for example, to determine whether to process a received read or write operation directed to a particular LUN in accordance with existing reservation information for the LUN. For example, a write command may be received at the node B 204 from the host 212 over the path I2-T3 where the write is directed to the LUN A 206. The node B, in particular, the local I/O processing module 334, may use the in-memory copy 338 of the new PRR DB to determine whether there is an existing reservation, for example, by another initiator other than I2 that would result in the node A rejecting (e.g., not servicing) the write and resulting in an error being returned to the host 212. In at least one embodiment, the local I/O processing module 334 may perform processing to service received I/O commands, such as read and/or write commands, directed to LUNs exposed over T3 and T4. The module 334 may use the information in the in-memory copy 338 of the new PRRR DB 336 as noted above.

In at least one embodiment, during the initial synchronization of the PRR DBs 316 and 336, received reservation and registration commands may be serviced. All such commands received at nodes A and B are sent to the primary node A's central PRR processing module 312.

What will now be described are two variations or embodiments of the techniques herein. A first embodiment is described with reference to FIGS. 5 and 6 which perform an on-demand technique in connection with initially synchronizing the old PRR DB 316 and the new PRR DB 318. A second embodiment is described with reference to FIGS. 7 and 8 which performs the initial synchronization of the old PRR DB 316 and the new PRR DB 318 which may be characterized as not on-demand. Both of the foregoing embodiments may have a process or thread that traverses a list of all the LUNs that may possibly have reservation and registration information in the old PRR DB 316. The process or thread may perform the initial synchronization of reservation and registration information on a per volume or LUN basis as the list is traversed. Both of the foregoing embodiments may also provide for receiving and servicing registration and reservation commands while the initial synchronization of the old PRR DB 316 and the new PRR DB 318 is in progress, or more generally, prior to the process or thread completing the initial synchronization of volume registration and reservation information for all the LUNs in the list.

The first embodiment, sometimes referred to as the on-demand technique, may perform the initial synchronization of volume registration and reservation information for a LUN in response to receiving a reservation or registration command for the LUN if such initial synchronization for the LUN's information has not already been performed by the thread or process traversing the list of LUNs. In particular, responsive to receiving the reservation or registration command for the LUN and determining that initial synchronization for the LUN has not yet been performed, processing may be performed to complete the initial synchronization for the LUN and also update both the old PRR DB 316 and the new PRR DB 336 in accordance with the command.

In contrast to the first embodiment, the second embodiment may not perform the initial synchronization of volume registration and reservation information for a LUN in response to receiving a reservation or registration command for the LUN if such initial synchronization for the LUN's information has not already been performed by the thread or process traversing the list of LUNs. Rather, in the second embodiment, the thread or processing traversing the list of LUNs may be relied upon to perform the initial synchronization of all the LUNs in the list. In the second embodiment, responsive to receiving the reservation or registration command for the LUN and determining that initial synchronization for the LUN has not yet been performed, processing may be performed to update the old PRR DB 316, but not the new PRR DB 336, in accordance with the command. In the second embodiment, responsive to receiving the reservation or registration command for the LUN and determining that initial synchronization for the LUN has been performed, processing may be performed to update both the old PRR DB 316 and the new PRR DB 336 in accordance with the command.

Figure 5:
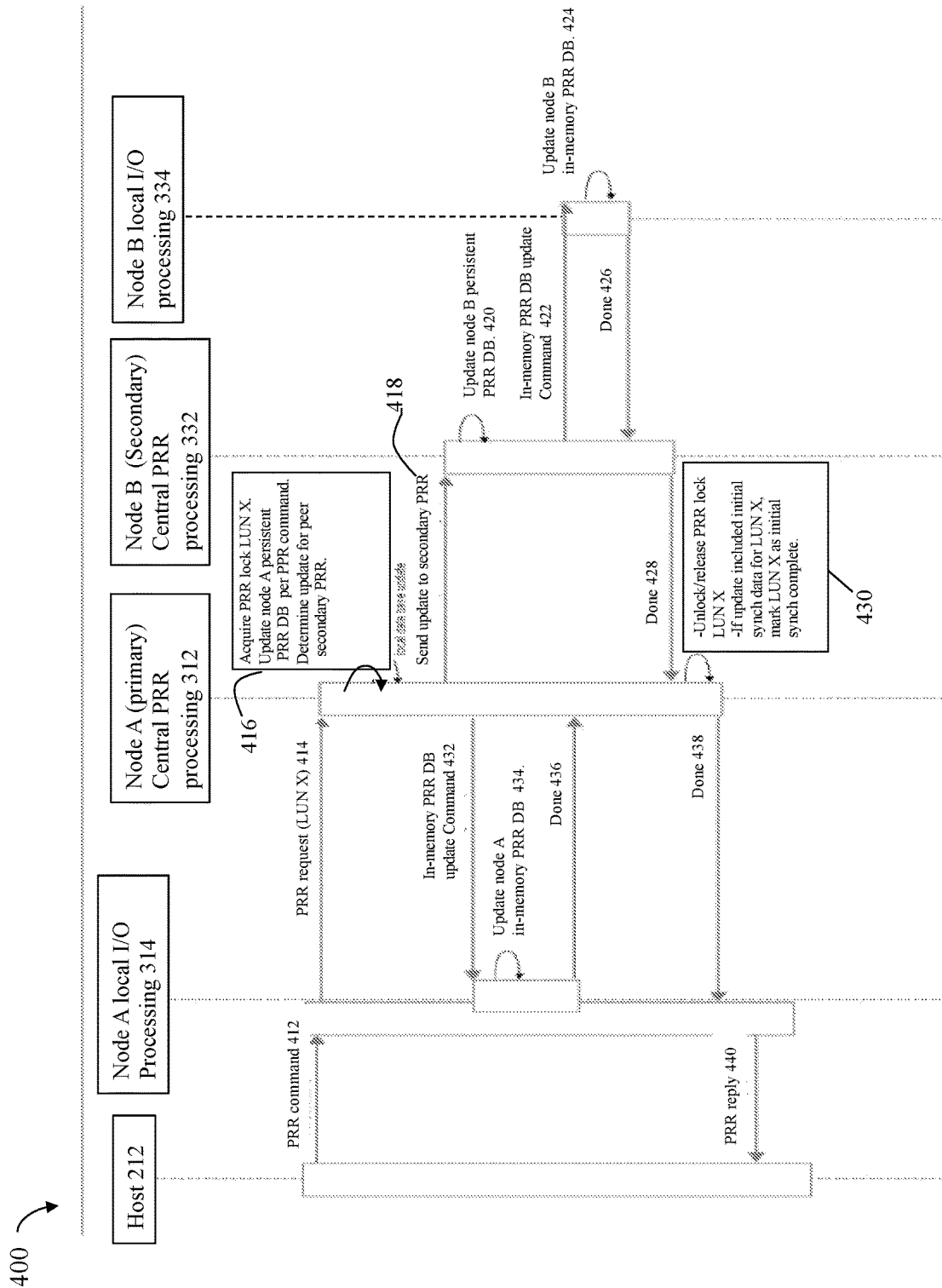
FIGS. 5 and 7 are examples of sequence diagrams of processing that may be performed in an embodiment in accordance with the techniques herein.

Referring to FIG. 5, shown is a sequence diagram 400 illustrating processing that may be performed in the first embodiment in accordance with techniques herein. The example 400 includes the host 212, node A local I/O processing 314, node A (primary) central PRR processing 312, node B (secondary) central PRR processing 332 and node B local I/O processing 334 corresponding to the modules or components of FIG. 4. Thus the sequence diagram of FIG. 5 illustrates processing and interactions between such components in the first embodiment in accordance with the techniques herein.

A PRR (persistent reservation or registration) command may be sent (412) from the host 212 to the node A 202 which is received by the local I/O processing module 314. The PRR command may be a registration or reservation command for a particular LUN, such as LUN X. The module 314 forwards (414) the PRR request to the central PRR processing module 314 of the primary node A. The module 312 may perform processing as denoted by the element 416 to: acquire the PRR lock for the LUN X; update the persistent old PRR DB 316 of the node A; and determine an update to be sent to the peer secondary node B where the update is to be applied by the node B to the new PRR DB 336 and its corresponding in-memory copy 338. The update may include the registration and/or reservation information of the received PRR command 412. Additionally, if the initial synchronization of volume reservation or registration command for the LUN X has not yet been performed, the update may include the existing information in the old PR DB 316 for the LUN X. Thus, if the initial synchronization of volume reservation or registration command for the LUN X has not yet been performed, the update may include a combination of first information to be copied from the old PRR DB 316 to the new PRR DB 336 for the initial synchronization for the LUN X and second information in accordance with the received PRR command 412. If the initial synchronization of volume reservation or registration command for the LUN X has been performed, the update may include only the above-noted second information in accordance with the received PRR command 412.

Consistent with other discussion herein, the step 416 processing may fail to acquire the PRR lock for the LUN X if the PRR lock is currently held in connection with other processing. If PRR lock for LUN X is taken, the request for the PRR lock for LUN X may wait in a queue associated with the PRR lock.

Following the step 416, a step 418 may be performed to send the update to the node B central PRR processing module 332. In response to receiving the update 418, the module 332 may perform processing in the step 420 to apply the received update to the node B's persistent new PRR DB 336; and may perform processing to send a command (422) to the local I/O processing module 334 of node B to also apply the received update to the in-memory copy 338 of the new PRR DB 336. The module 334 may receive the command 422 and perform processing in the step 424 to update the in-memory copy 338 of the new PRR DB on the node B. After completing the step 424, the module 334 may return a response (426) to the module 332 indicating the command 422 has completed. Subsequently, the module 332 may return a response (428) to the module 312 indicating the node B has completed processing for the update 418 (e.g., the update has been applied to the new PRR DB 336 and its corresponding in-memory copy 338). Upon receiving the response 428, the module 312 unlock or release the PRR lock for LUN X in the step 430. Additionally, in the step 430, the module 312 may mark the initial synchronization of LUN X has complete if the update sent in the step 418 included information for the initial synchronization of volume registration and reservation information for the LUN X.

Responsive to releasing or unlocking the PPR lock for the LUN X, a blocked or waiting request on the lock's associated queue may be dequeued and signaled to resume processing at the point in execution which triggered the queueing of the request. In connection with FIG. 5, if a request is dequeued which previously was blocked and placed on the queue at the step 416, the request processing may resume with the step 416 to attempt to now acquire the PRR lock for the LUN X.

After completing the step 430, the module 312 may return a response (438) to the module 314 indicating that processing of the command or request 414 has completed. Subsequently, the module 314 may return a PRR reply 440 to the host 212 indicating completion of the PRR command 412.

It should be noted that the sequence diagram of FIG. 5 illustrates processing where the PRR command 412 is send from the host 212 to the primary node A. More generally, the PRR command may be sent from any host, such as the host 212 or 214. Additionally, PRR commands may also be sent by one or more hosts 212, 214 to the secondary node B. In this latter case where a PRR command is received at the node B, the received PRR command may be received by the node B local I/O processing module 334 which then forwards the PRR command to the module 312 for processing as described above. In this latter case, the reply or response denoted by 438 is sent from the component 312 to the component 334; and the reply or response denoted by 440 is sent from the component 334 to sending host.

Figure 6:
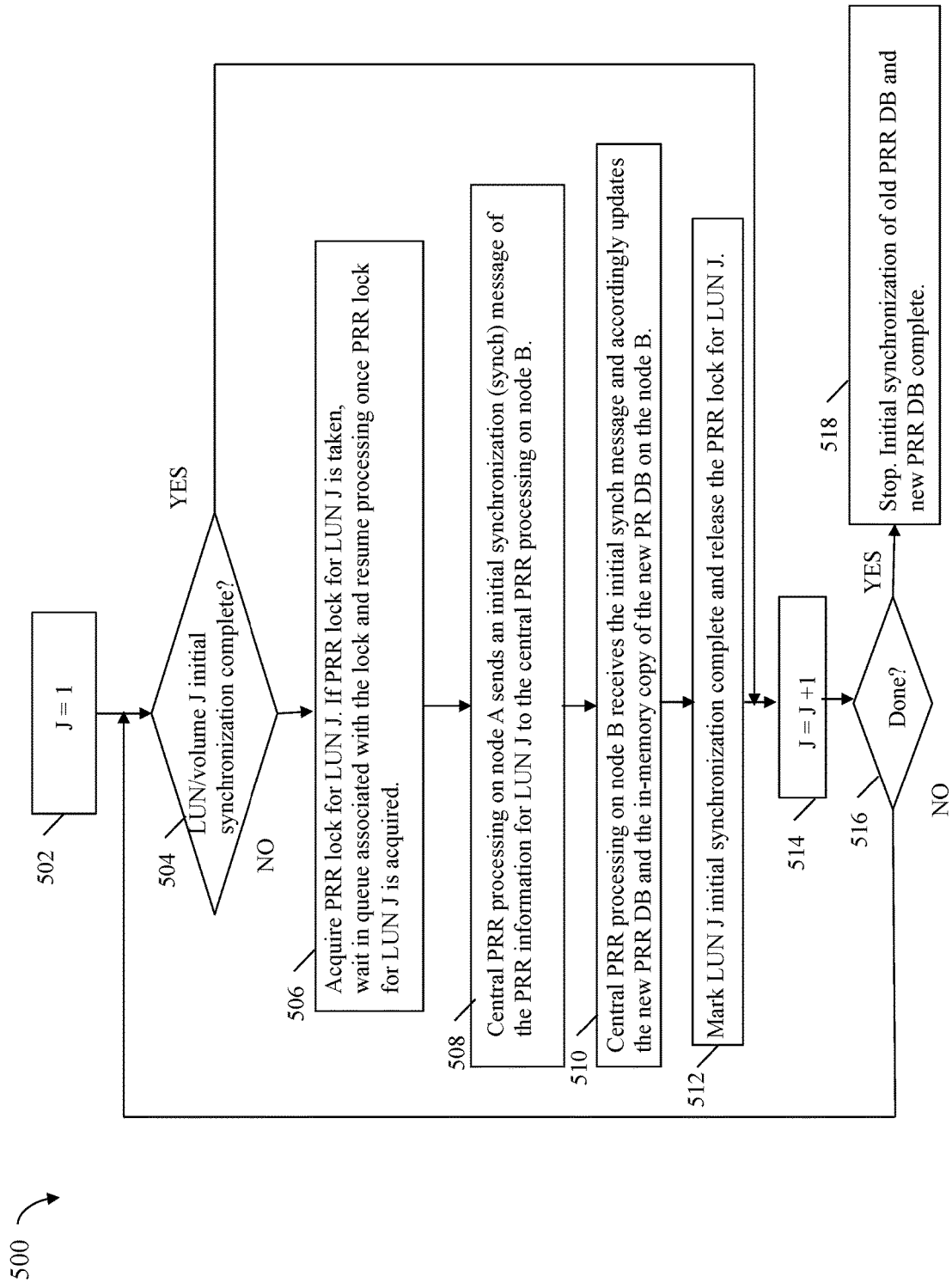
FIGS. 6, 8 and 9 are flowcharts of processing steps that may be performed in at least one embodiment in accordance with the techniques herein.

Referring to FIG. 6, shown is a flowchart of processing steps that may be performed by a thread or processing in the first embodiment in accordance with the techniques herein. The flowchart 500 processing may be performed, for example, by a thread or process traversing a list of LUNs of volumes in the system that may have volume reservation and registration information in the old PRR DB 336. In this case, initial synchronization of such information may be performed for the list of LUNs in order to synchronize the contents of the new PRR DB 336 to include the same information as the old PRR DB 316.

At a step 502, a variable J may be assigned 1 (one) denoting the first LUN in the list. From the step 502, control proceeds to the step 504. At the step 504, a determination is made as to whether the initial synchronization of volume registration and reservation information for LUN J has already been completed. If the step 504 evaluates to yes, control proceeds to the step 514. If the step 504 evaluates to no, control proceeds to the step 506.

At the step 506, processing may be performed to acquire the PRR lock for the LUN J. If PRR lock for LUN J is already taken and thus cannot be acquired at the current time, the request to acquire the PRR lock is temporarily blocked and waits in a queue associated with the PRR lock for LUN J. Consistent with discussion elsewhere herein, responsive to the PRR lock for the LUN J being released, a waiting request on the lock's associated queue is dequeued and signaled to resume processing at the point in execution which triggered the queueing of the request. In connection with FIG. 6, if a request is dequeued which previously was blocked and placed on the queue at the step 506, the request processing may resume with the step 506 to attempt to now acquire the PRR lock for the LUN J. From the step 506, control proceeds to the step 508.

At the step 508, the central PRR processing module 312 on the primary node A sends an initial synchronization (synch) message including the PRR information for LUN J to the central PRR processing module 332 of the secondary node B. From the step 508, control proceeds to the step 510.

At the step 510, the central PRR processing module 332 of node B received the initial sync message and data and accordingly updates the new PRR DB 336 and its associated in-memory copy 338. In at least one embodiment, the step 510 may include the module 332 communicating with the module 334 to apply the PRR information for LUN J for the initial synchronization to the in-memory copy 338. From the step 510, control proceeds to the step 512.

At the step 512, processing may be performed to mark initial synchronization of the volume reservation and registration information for the LUN J as complete. Also in the step 512, processing may be performed to release the PRR lock for the LUN J. From the step 512, control proceeds to the step 514 where J is incremented by 1. From the step 514, control proceeds to the step 516 where a determination is made as to whether processing for all LUNs on the list is complete. If the step 516 evaluates yes, control proceeds to the step 518 where processing stops. At the step 518, it may be determined that the initial synchronization of the old PRR DB 316 and the new PRR DB 336 is complete. If the step 516 evaluates to no, control proceeds to the step 504 to perform initial synchronization of volume reservation and registration information (e.g., PRR information) for the next LUN J in the list.

In the first embodiment, I/Os may be received by the system 210 while the initial synchronization of the old PRR DB 316 and the new PR DB 336 is ongoing such as prior to completing the processing of FIG. 6. In at least one embodiment, such I/Os received may be processed using information as included in the old PRR DB 316 and its corresponding in memory copy 318. If the I/O is received at the node B 210 while the initial synchronization of the old PRR DB 316 and the new PR DB 336 is ongoing such as prior to completing the processing of FIG. 6, an embodiment using the on-demand technique as described in connection with FIGS. 5 and 6 may handle the received I/O in any suitable manner. For example, the I/O may be forwarded to the node A 202 for processing to utilize the PRR information as included in the DB 316 and/or its in-memory copy 318. As a variation in at least one embodiment, the I/O directed to a particular LUN may be serviced using the PRR information for the LUN as stored in 338 and 336 if initial synchronization of the PRR information for the LUN has been completed. If the initial synchronization of the PRR information for the LUN has not yet completed, 1) the I/O may trigger initial synchronization of the volume reservation and registration information for the particular LUN where the PRR information for the particular LUN initial synchronization may be copied from the old PRR DB 316 or its in-memory copy 318 to the new PRR DB 336 and its in memory copy 338; and 2) the I/O may then be serviced using the in memory copy 338 of the new PRR DB 336. The initial synchronization for the I/O may include performing processing as described in connection with the steps 506, 508 510 and 512 of FIG. 6 for the particular LUN. The foregoing are some examples of how an embodiment may handle processing of a received I/O while the initial synchronization of the old PRR DB 316 and the new PR DB 336 is ongoing such as prior to completing the processing of FIG. 6. More generally, an embodiment may handle the received I/O in any suitable manner.

Figure 7:
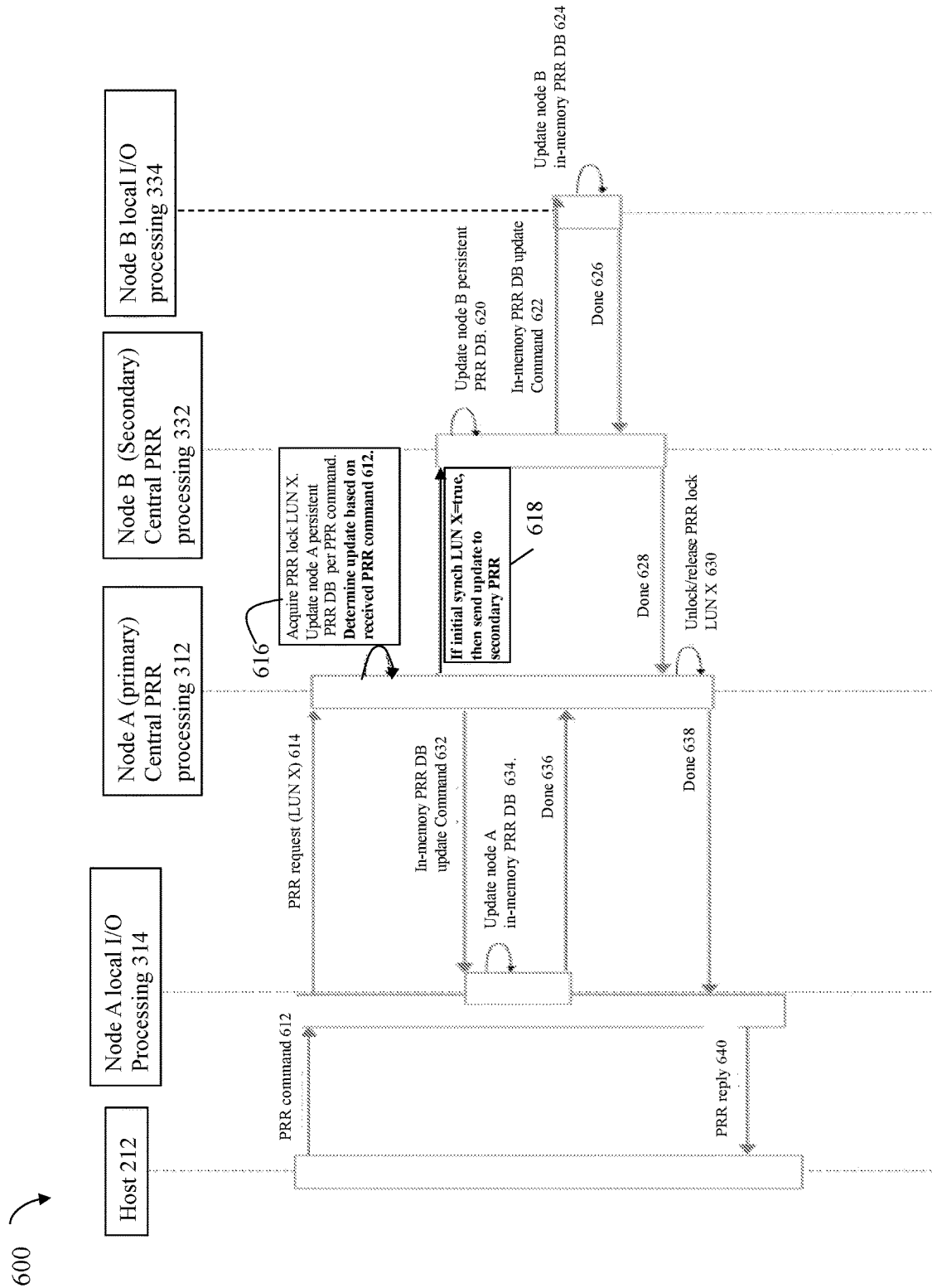
Figure 8:
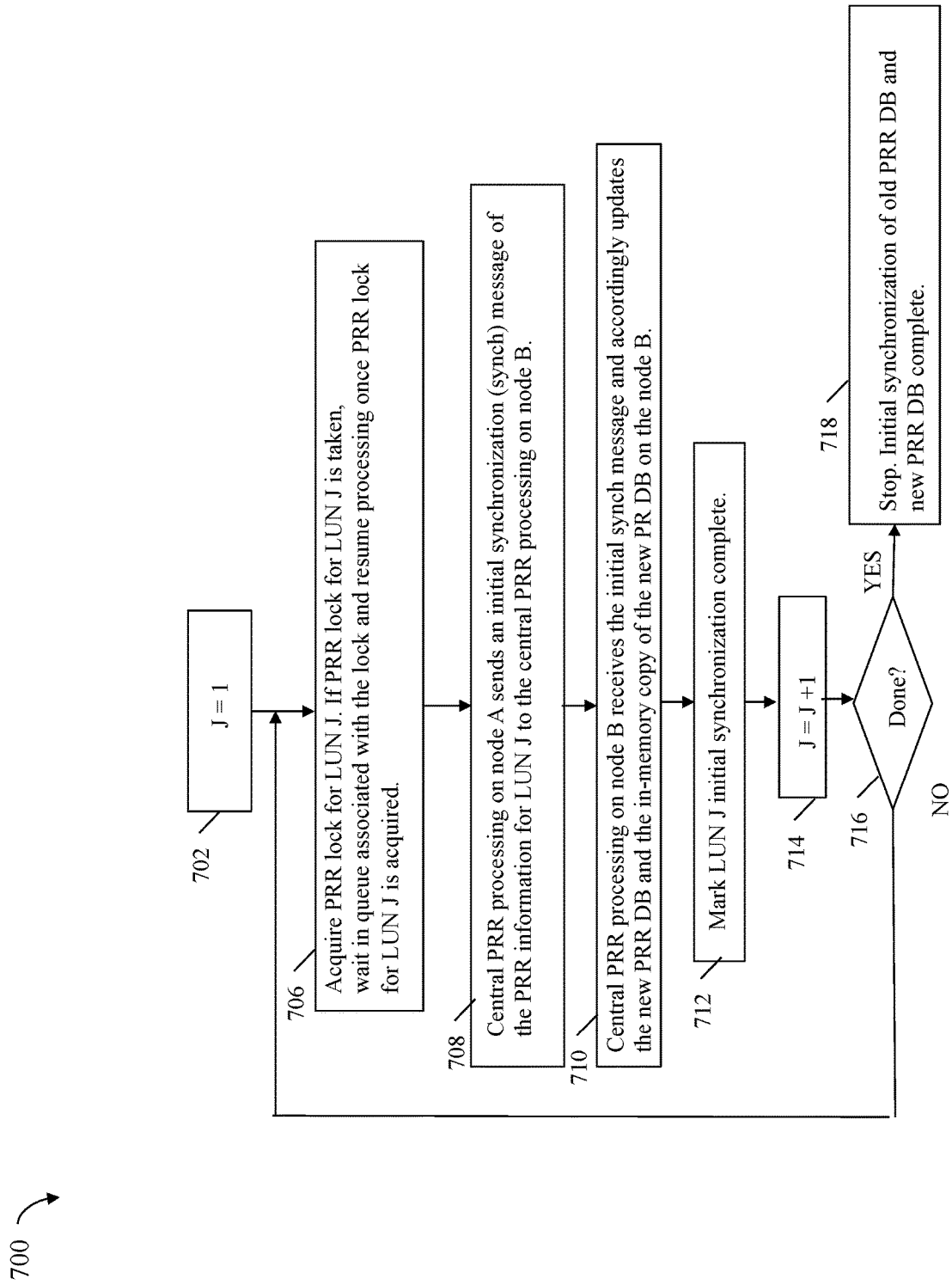

What will now be described with reference to FIGS. 7 and 8 is the second embodiment noted above which does not use an on-demand technique in connection with performing the initial synchronization of the old PRR DB 316 and the new PRR DB 336. Rather, in the second embodiment, the thread or processing traversing the list of LUNs (e.g., as described in connection with FIG. 8 below) may be relied upon to perform the initial synchronization of all the LUNs in the list. In the second embodiment, responsive to receiving the reservation or registration command for the LUN and determining that initial synchronization for the LUN has not yet been performed, processing may be performed to update the old PRR DB 316, but not the new PRR DB 336, in accordance with the command. In the second embodiment, responsive to receiving the reservation or registration command for the LUN and determining that initial synchronization for the LUN has been performed, processing may be performed to update both the old PRR DB 316 and the new PRR DB 336 in accordance with the command. The foregoing and other aspects of the second embodiment are discussed in more detail below.

Referring to FIG. 7, shown is a sequence a sequence diagram 600 illustrating processing that may be performed in the second embodiment in accordance with techniques herein. The example 600 includes the host 212, node A local I/O processing 314, node A (primary) central PRR processing 312, node B (secondary) central PRR processing 332 and node B local I/O processing 334 corresponding to the modules or components of FIG. 4. Thus the sequence diagram of FIG. 6 illustrates processing and interactions between such components in the first embodiment in accordance with the second embodiment of the techniques herein.

A PRR (persistent reservation or registration) command may be sent (612) from the host 212 to the node A 202 which is received by the local I/O processing module 314. The PRR command may be a registration or reservation command for a particular LUN, such as LUN X. The module 314 forwards (614) the PRR request to the central PRR processing module 314 of the primary node A. The module 312 may perform processing as denoted by the element 616 to: acquire the PRR lock for the LUN X; update the persistent old PRR DB 316 of the node A; and determine an update to be sent to the peer secondary node B where the update is to be applied by the node B to the new PRR DB 336 and its corresponding in-memory copy 338. The update may include the registration and/or reservation information of the received PRR command 612.

Consistent with other discussion herein, the step 616 processing may fail to acquire the PRR lock for the LUN X if the PRR lock is currently held in connection with other processing. If PRR lock for LUN X is taken, the request for the PRR lock for LUN X may wait in a queue associated with the PRR lock.

Following the step 616, a step 618 may be performed where the update determined in accordance with the received PRR command 612 is conditionally sent to the module 332 if the initial synchronization of the volume reservation and registration information (e.g., PRR information) for the LUN X has already been performed. Responsive to the step 618 determining the initial synchronization of the volume reservation and registration information (e.g., PRR information) for the LUN X has already been performed, the step 618 sends the update to the module 332. Generally, the steps 620, 622, 624 and 626 are also performed conditionally responsive to determining the initial synchronization of the volume reservation and registration information (e.g., PRR information) for the LUN X has already been performed. In the step 620, the module 332 receives and applies the update to the new PRR DB 336 of node B, and then sends a command 622 to the module 334 to update the in-memory copy 338. In response to receiving the command 622, the module 334 updates (624) the in-memory copy 338 of the new PRR DB 336, and then returns a response (626) to the module 332. Subsequent to completing the steps 616 and 618 (and, if applicable, also receiving the response 626 if the update was conditionally sent in the step 618 to the module 332), the module 332 sends a response (628) to the module 312. In response to receiving the reply 628, the module 312 performs the step 630 to release or unlock the PRR lock for the LUN X and send a response (638) to the module 314 where the module 314 then returns the PRR reply 640 to the host 212 indicating completion of the PRR command 412.

Responsive to releasing or unlocking the PPR lock for the LUN X in the step 630, a blocked or waiting request on the lock's associated queue may be dequeued and signaled to resume processing at the point in execution which triggered the queueing of the request. In connection with FIG. 7, if a request is dequeued which previously was blocked and placed on the queue at the step 616, the request processing may resume with the step 616 to attempt to now acquire the PRR lock for the LUN X.

It should be noted that the sequence diagram of FIG. 7 illustrates processing where the PRR command 612 is send from the host 212 to the primary node A. More generally, the PRR command 612 may be sent from any host, such as the host 212 or 214. Additionally, PRR commands 612 may also be sent by one or more hosts 212, 214 to the secondary node B. In this latter case where a PRR command is received at the node B, the received PRR command may be received by the node B local I/O processing module 334 which then forwards the PRR command to the module 312 for processing as described above. In this latter case, the reply or response denoted by 638 may be sent from the component 312 to the component 334; and the reply or response denoted by 640 may be sent from the component 334 to sending host.

Referring to FIG. 8, shown is a flowchart of processing steps that may be performed by a thread or processing in the second embodiment in accordance with the techniques herein. The flowchart 700 processing may be performed, for example, by a thread or process traversing a list of LUNs of volumes in the system that may have volume reservation and registration information in the old PRR DB 336. In this case, initial synchronization of such information may be performed for the list of LUNs in order to synchronize the contents of the new PRR DB 336 to include the same information as the old PRR DB 316.

At a step 702, a variable J may be assigned 1 (one) denoting the first LUN in the list. From the step 702, control proceeds to the step 706.

At the step 706, processing may be performed to acquire the PRR lock for the LUN J. If PRR lock for LUN J is already taken and thus cannot be acquired at the current time, the request to acquire the PRR lock is temporarily blocked and waits in a queue associated with the PRR lock for LUN J. Consistent with discussion elsewhere herein, responsive to the PRR lock for the LUN J being released, a waiting request on the lock's associated queue is dequeued and signaled to resume processing at the point in execution which triggered the queueing of the request. In connection with FIG. 8, if a request is dequeued which previously was blocked and placed on the queue at the step 706, the request processing may resume with the step 706 to attempt to now acquire the PRR lock for the LUN J. From the step 706, control proceeds to the step 708.

At the step 708, the central PRR processing module 312 on the primary node A sends an initial synchronization (synch) message including the PRR information for LUN J to the central PRR processing module 332 of the secondary node B. From the step 708, control proceeds to the step 710.

At the step 710, the central PRR processing module 332 of node B received the initial sync message and data and accordingly updates the new PRR DB 336 and its associated in-memory copy 338. In at least one embodiment, the step 710 may include the module 332 communicating with the module 334 to apply the PRR information for LUN J for the initial synchronization to the in-memory copy 338. From the step 710, control proceeds to the step 712.

At the step 712, processing may be performed to mark initial synchronization of the volume reservation and registration information for the LUN J as complete. Also in the step 712, processing may be performed to release the PRR lock for the LUN J. From the step 712, control proceeds to the step 714 where J is incremented by 1. From the step 714, control proceeds to the step 716 where a determination is made as to whether processing for all LUNs on the list is complete. If the step 716 evaluates yes, control proceeds to the step 718 where processing stops. At the step 718, it may be determined that the initial synchronization of the old PRR DB 316 and the new PRR DB 336 is complete. If the step 716 evaluates to no, control proceeds to the step 704 to perform initial synchronization of volume reservation and registration information (e.g., PRR information) for the next LUN J in the list.

In the second embodiment, I/Os may be received by the system 210 while the initial synchronization of the old PRR DB 316 and the new PR DB 336 is ongoing such as prior to completing the processing of FIG. 8. In at least one embodiment, such I/Os received may be processed using PRR information as included in the old PRR DB 316 and its corresponding in memory copy 318. If the I/O is received at the node B 210 while the initial synchronization of the old PRR DB 316 and the new PR DB 336 is ongoing such as prior to completing the processing of FIG. 8, an embodiment performing processing as described in connection with FIGS. 7 and 8 may handle the received I/O in any suitable manner. For example, the I/O received at the node B 204 (secondary) may be forwarded to the node A 202 (primary) for processing to utilize the PRR information as included in the DB 316 and/or its in-memory copy 318. As a variation in at least one embodiment, the I/O directed to a particular LUN received at the node B may be serviced using the PRR information for the LUN as stored in 338 and 336 if initial synchronization of the PRR information for the LUN has been completed. If the initial synchronization of the PRR information for the LUN has not yet completed, the I/O may be conditionally forwarded to the primary node A for processing. The foregoing are some examples of how an embodiment may handle processing of a received I/O while the initial synchronization of the old PRR DB 316 and the new PR DB 336 is ongoing such as prior to completing the processing of FIG. 8. More generally, an embodiment may handle the received I/O in any suitable manner.

Figure 9:
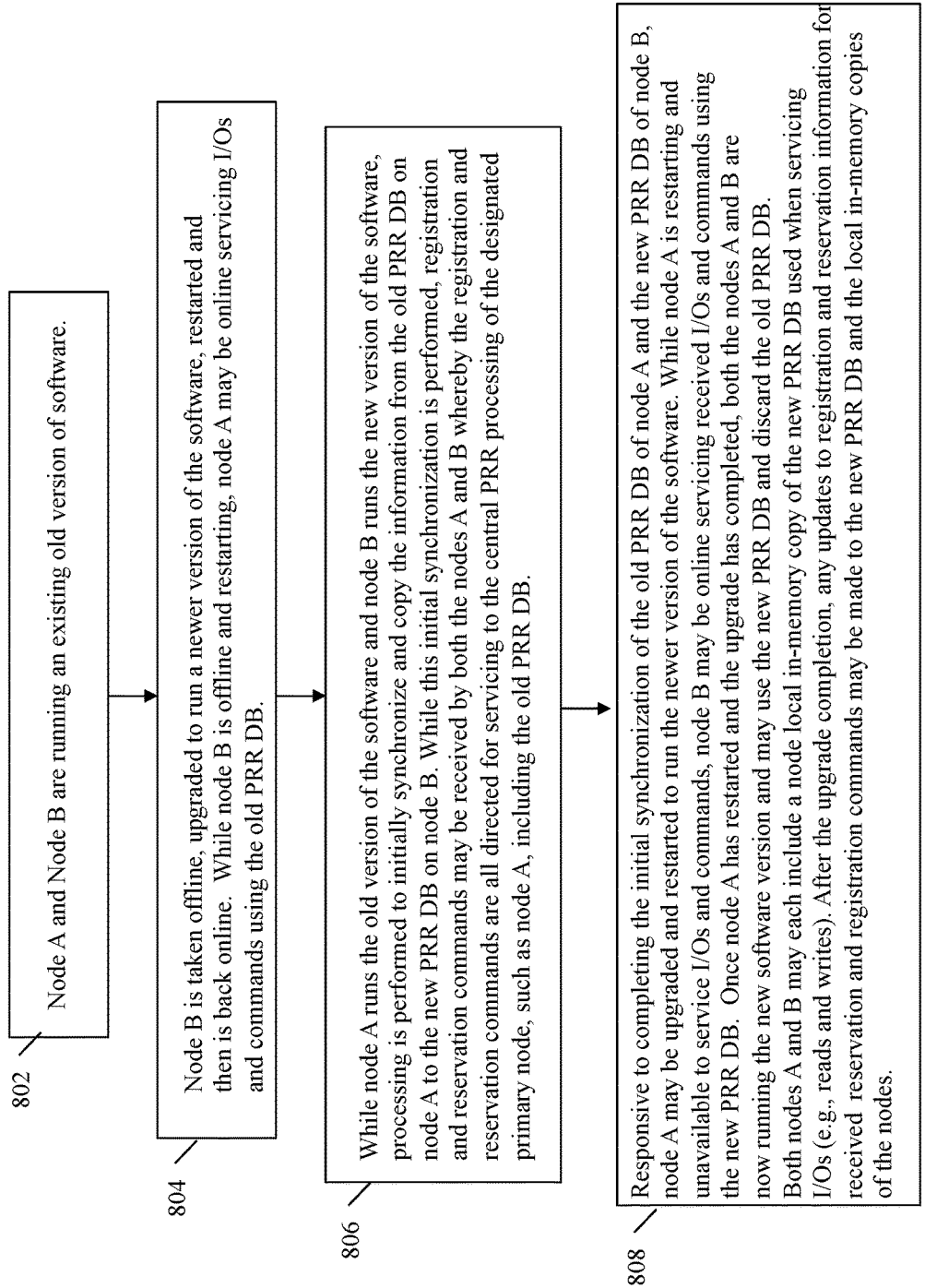

Referring to FIG. 9, shown is another flowchart of processing steps that may be performed in an embodiment in accordance with the techniques herein. The flowchart 800 generally summarizes processing as described above in connection with performing a NDU of software in a dual node appliance or system in at least one embodiment in accordance with the techniques herein.

At a step 802, the node A and the node B are running an existing old version of software to be upgraded by the NDU to a newer version. From the step 802, control proceeds to the step 804.

At the step 804, the node B is taken offline, upgraded to run a newer version of the software, restarted and then is back online. While node B is offline and restarting, node A may be online servicing I/Os and commands using the old PRR DB. From the step 804, control proceeds to the step 806.

At the step 806, while node A runs the old version of the software and node B runs the new version of the software, processing may be performed to initially synchronize and copy the information from the old PRR DB on node A to the new PRR DB on node B. While this initial synchronization is performed, registration and reservation commands may be received by both the nodes A and B whereby the registration and reservation commands are all directed for servicing to the central PRR processing of the designated primary node, such as node A, including the old PRR DB. The initial synchronization of the old PRR DB and the new PRR DB may be performed, for example, using the first embodiment of the techniques herein as described in connection with FIGS. 5 and 6. The initial synchronization of the old PRR DB and the new PRR DB may be performed, for example, using the second embodiment of the techniques herein as described in connection with FIGS. 7 and 8. From the step 806, control proceeds to the step 808.

At the step 808, responsive to completing the initial synchronization of the old PRR DB of node A and the new PRR DB of node B, node A may be upgraded and restarted to run the newer version of the software. While node A is restarting and unavailable to service I/Os and commands, node B may be online servicing received I/Os and commands using the new PRR DB. Once node A has restarted and the upgrade has completed, both the nodes A and B are now running the new software version and may use the new PRR DB and discard the old PRR DB. Both nodes A and B may each include a node local in-memory copy of the new PRR DB used when servicing I/Os (e.g., reads and writes). After the upgrade completion, the old PRR DB may not be used. After the upgrade completion, any updates to registration and reservation information for received reservation and registration commands may be made to the new PRR DB and also applied to local in-memory copies of the new PRR DB as may be included in the nodes A and B. In this manner, after the upgrade completion, I/Os received by the data storage system or appliance may be serviced using the in-memory copies of the new PRR DB as may be included in the node local memories of the nodes A and B.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of processing commands comprising:
   initially synchronizing a target database of volume reservation and registration information with a source database of volume reservation and registration information;
   while initially synchronizing the target database with the source database, enabling volume reservation and registration command processing on both a first node managing the source database and a second node managing the target database;
   while initially synchronizing the target database with the source database, performing first processing to service a first command that is any of a reservation command and a registration command for a first volume; and
   after initially synchronizing the target database with the source database, using the target database of the second node when servicing reservation and registration commands received at both the first node and the second node, and wherein the first processing includes:
   acquiring a first lock for reservation and registration information for the first volume, wherein the first lock provides a holder of the first lock with exclusive access to reservation and registration information for the first volume as stored in the source database; and
   responsive to acquiring the first lock for reservation and registration information for the first volume, performing second processing comprising:
      updating the source database managed by the first node with any of reservation and registration information for the first volume in accordance with the first command.

2. The method of claim 1, wherein the first command is received at the second node and forwarded to the first node for servicing.

3. The method of claim 1, wherein the second processing includes updating an in-memory copy of the source database on the first node with any of reservation and registration information for the first volume in accordance with the first command.

4. The method of claim 1, wherein the second processing includes:
   determining whether initial synchronization of the source database and the target database is complete for the first volume; and
   responsive to determining the initial synchronization of the source database and the target database is not complete for the first volume, performing third processing comprising:
      determining a first update for the target database, wherein the first update includes first volume reservation and registration information in accordance with the first command and includes existing reservation and registration information for the first volume stored in the source database;
      sending the first update from the first node to the second node;
      applying the first update to the target database of the second node and to an in-memory copy of the target database; and
      marking initial synchronization of the source database and the target database as complete for the first volume.

5. The method of claim 4, wherein responsive to determining the initial synchronization of the source database and the target database is complete for the first volume, performing third processing comprising:
- determining a second update for the target database, wherein the second update includes the first volume reservation and registration information in accordance with the first command and does not include the existing reservation and registration information for the first volume stored in the source database;
- sending the second update from the first node to the second node; and
- applying the second update to the target database of the second node and to an in-memory copy of the target database.

6. The method of claim 4, wherein the first volume is one of a plurality of volumes, the plurality of volumes having a plurality of locks, wherein each of the plurality of volumes has a corresponding one of the plurality of locks that is acquired to obtain exclusive access to volume reservation and registration information in the source database for said each volume, and wherein each of the plurality of locks is associated with one of a plurality of queues that holds requests for said each lock that are blocked waiting to acquire said each lock.

7. The method of claim 6, wherein for each of the plurality of volumes, performing fourth processing comprising:
- acquiring one of the plurality of locks for said each volume;
- determining whether initial synchronization of the source database and the target database is complete for the said each volume;
- responsive to determining the initial synchronization of the source database and the target database is not complete for said each volume, performing fifth processing comprising:
  - determining a corresponding update for the target database, wherein the corresponding update includes existing reservation and registration information for said each volume stored in the source database;
  - sending the corresponding update from the first node to the second node;
  - applying the corresponding update to the target database of the second node and to an in-memory copy of the target database; and
  - marking initial synchronization of the source database and the target database as complete for said each volume; and
- releasing said one lock for said each volume.

8. The method of claim 1, wherein the first processing includes:
- determining whether the first lock for reservation and registration information for the first volume is taken; and
- responsive to determining the first lock is taken, placing a first request for the first lock in a first queue associated with the first lock, wherein the first request is associated with the first command.

9. The method of claim 8, further comprising:
- responsive to releasing the first lock, selecting the first request of the first queue for processing and performing said acquiring of the first lock for reservation and registration information for the first volume.

10. The method of claim 1, wherein said initially synchronizing a target database of volume reservation and registration information with a source database of volume reservation and registration information are performed as part of an upgrade process that upgrades software of the first node and the second node.

11. The method of claim 1, wherein the second processing includes:
- determining whether initial synchronization of the source database and the target database is complete for the first volume;
- responsive to determining the initial synchronization of the source database and the target database is complete for the first volume, performing third processing comprising:
  - determining a first update for the target database, wherein the first update includes first volume reservation and registration information in accordance with the first command;
  - sending the first update from the first node to the second node;
  - applying the first update to the target database of the second node and to an in-memory copy of the target database; and
- releasing the first lock.

12. The method of claim 11, wherein the first volume is one of a plurality of volumes, the plurality of volumes having a plurality of locks, wherein each of the plurality of volumes has a corresponding one of the plurality of locks that is acquired to obtain exclusive access to volume reservation and registration information in the source database for said each volume, and wherein each of the plurality of locks is associated with one of a plurality of queues that holds requests for said each lock that are blocked waiting to acquire said each lock.

13. The method of claim 12, wherein for each of the plurality of volumes, performing fourth processing comprising:
- acquiring one of the plurality of locks for said each volume;
- determining a corresponding update for the target database, wherein the corresponding update includes existing reservation and registration information for said each volume stored in the source database;
- sending the corresponding update from the first node to the second node;
- applying the corresponding update to the target database of the second node and to an in-memory copy of the target database; and
- marking initial synchronization of the source database and the target database as complete for said each volume; and
- releasing said one lock for said each volume.

14. A system comprising:
- one or more processors; and
- one or more memories comprising code stored thereon that, when executed, performs a method of processing commands comprising:
  - initially synchronizing a target database of volume reservation and registration information with a source database of volume reservation and registration information;
  - while initially synchronizing the target database with the source database, enabling volume reservation and registration command processing on both a first node managing the source database and a second node managing the target database;
  - while initially synchronizing the target database with the source database, performing first processing to service a first command that is any of a reservation command and a registration command for a first volume; and after initially synchronizing the target database with the source database, using the target database of the second node when servicing reservation and registration commands received at both the first node and the second node, and wherein the first processing includes:

acquiring a first lock for reservation and registration information for the first volume, wherein the first lock provides a holder of the first lock with exclusive access to reservation and registration information for the first volume as stored in the source database; and responsive to acquiring the first lock for reservation and registration information for the first volume, performing second processing comprising:

updating the source database managed by the first node with any of reservation and registration information for the first volume in accordance with the first command.

15. A non-transitory computer readable medium comprising code stored thereon that, when executed, performs a method of processing commands comprising:

initially synchronizing a target database of volume reservation and registration information with a source database of volume reservation and registration information;

while initially synchronizing the target database with the source database, enabling volume reservation and registration command processing on both a first node managing the source database and a second node managing the target database;

while initially synchronizing the target database with the source database, performing first processing to service a first command that is any of a reservation command and a registration command for a first volume; and after initially synchronizing the target database with the source database, using the target database of the second node when servicing reservation and registration commands received at both the first node and the second node, and wherein the first processing includes:

acquiring a first lock for reservation and registration information for the first volume, wherein the first lock provides a holder of the first lock with exclusive access to reservation and registration information for the first volume as stored in the source database; and responsive to acquiring the first lock for reservation and registration information for the first volume, performing second processing comprising:

updating the source database managed by the first node with any of reservation and registration information for the first volume in accordance with the first command.

16. The non-transitory computer readable medium of claim 15, wherein the first command is received at the second node and forwarded to the first node for servicing.

17. The non-transitory computer readable medium of claim 15, wherein the second processing includes updating an in-memory copy of the source database on the first node with any of reservation and registration information for the first volume in accordance with the first command.

18. The non-transitory computer readable medium of claim 15, wherein the second processing includes:

determining whether initial synchronization of the source database and the target database is complete for the first volume;

responsive to determining the initial synchronization of the source database and the target database is not complete for the first volume, performing third processing comprising:

determining a first update for the target database, wherein the first update includes first volume reservation and registration information in accordance with the first command and includes existing reservation and registration information for the first volume stored in the source database;

sending the first update from the first node to the second node;

applying the first update to the target database of the second node and to an in-memory copy of the target database; and marking initial synchronization of the source database and the target database as complete for the first volume.

* * * * *